(12) United States Patent
Bell et al.

(10) Patent No.: US 6,921,136 B2
(45) Date of Patent: Jul. 26, 2005

(54) AUTOMATIC SEAT BELT BUCKLE TONGUE RELEASING MECHANISM

(75) Inventors: John Bell, Carlisle (GB); Amaya Munoz, Waverton-Wigton (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 46 days.

(21) Appl. No.: 10/936,201

(22) Filed: Sep. 9, 2004

(65) Prior Publication Data

US 2005/0104436 A1 May 19, 2005

(30) Foreign Application Priority Data

Nov. 17, 2003 (GB) .................................... 0326766

(51) Int. Cl.[7] ............................................. B60R 22/00
(52) U.S. Cl. ................ 297/468; 297/378.12; 297/483; 280/801.1
(58) Field of Search ...................... 297/378.1, 378.12, 297/468, 483, 474, 475; 280/801.1, 807, 280/808

(56) References Cited

U.S. PATENT DOCUMENTS

| | | | | |
|---|---|---|---|---|
| 4,445,722 A | * | 5/1984 | Schaper ....................... | 297/468 |
| 5,393,123 A | * | 2/1995 | Hernandez et al. ..... | 297/378.12 |
| 5,690,386 A | * | 11/1997 | Chabanne .............. | 297/378.12 |
| 5,692,803 A | * | 12/1997 | Luik et al. .................. | 280/808 |
| 6,068,341 A | * | 5/2000 | Rink ........................... | 297/483 |

* cited by examiner

*Primary Examiner*—Peter R. Brown
(74) *Attorney, Agent, or Firm*—Lonnie Drayer

(57) ABSTRACT

A vehicle seat that is removable from a vehicle has an automatic buckle release mechanism. The vehicle seat has a seat base and a seat back. To prepare the seat for removal from the vehicle the seat back is pivoted about an axis towards the seat base. The seat base has a seat belt buckle attached thereto. The seat belt buckle has a release mechanism for releasing from the seat belt buckle a buckle tongue that is assembled with a seat belt webbing. The seat back has an actuator arm attached thereto that pivots with the seat back. The actuator arm causes the release mechanism of the seat belt buckle to operate in a buckle tongue releasing manner when the seat back is pivoted towards the seat base.

20 Claims, 8 Drawing Sheets

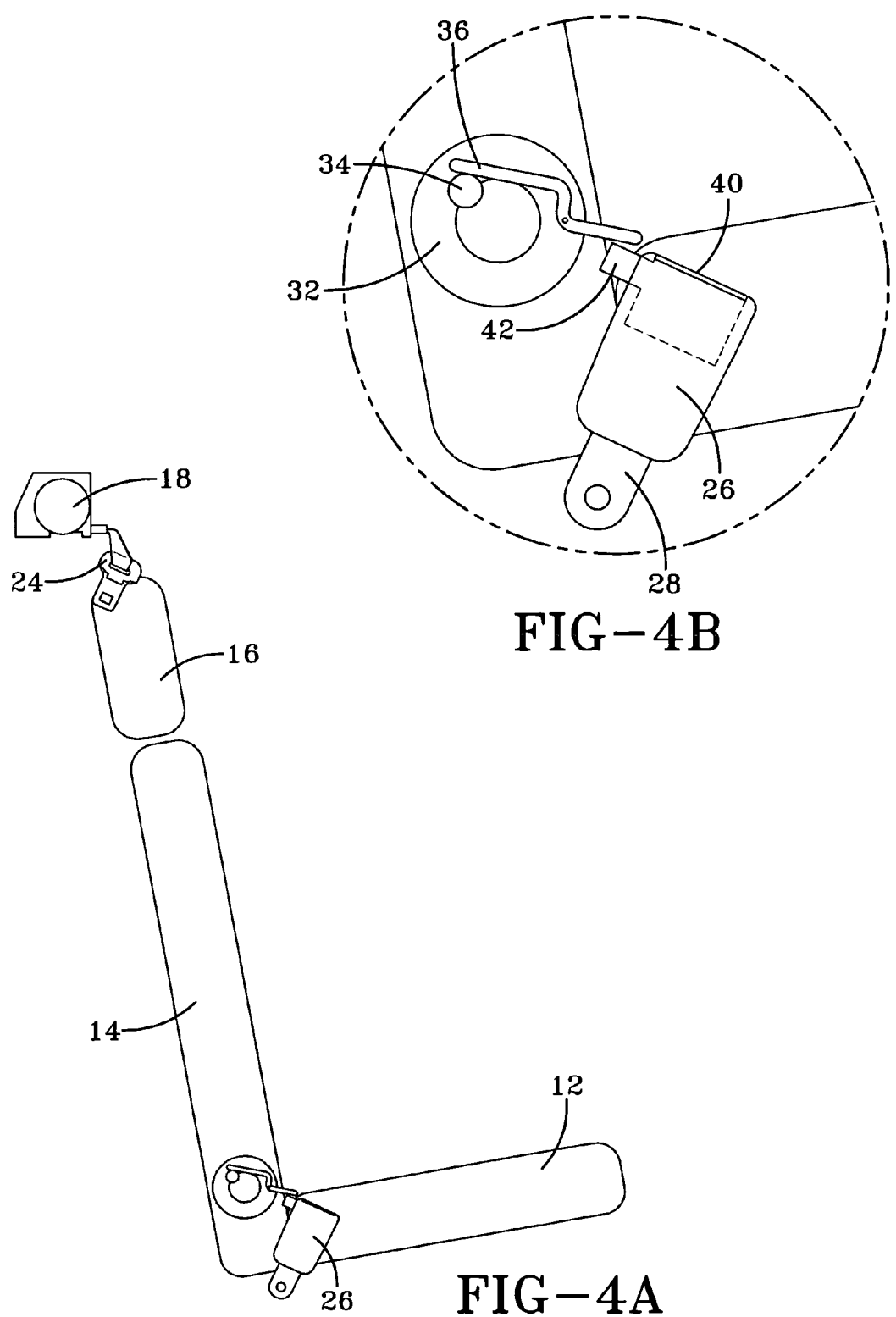

AUTOMATIC SEAT BELT BUCKLE TONGUE RELEASING MECHANISM

FIELD OF THE INVENTION

The present invention relates to a buckle release mechanism for a seat belt associated with a vehicle seat that is removable from a vehicle.

BACKGROUND OF THE INVENTION

A popular class of motor vehicles, commonly known as multi-purpose vehicles, has three or more rows of seating with at least one row of seats readily removable from the vehicle. One of the anchoring points of a seat belt for such a removable seat is a buckle that is attached to the seat base, and is referred to in the art as a sill end fixing buckle. A buckle tongue that is attached to the seat belt webbing is normally retained in the sill end buckle until the vehicle seat is required to be removed from the vehicle. Customer Surveys have found that owners of this type of vehicle have tried to remove the seat with the sill end tongue still engaged causing aggravation and unnecessary stresses on the seat belt structure. The present invention solves this problem by ensuring that the sill end buckle tongue will be automatically released from the buckle when the seat is being removed or repositioned in the vehicle. While the invention has particular applicability to the center seat in a row of seats, it can be employed with seats in any location in the vehicle.

SUMMARY OF THE INVENTION

According to the present invention there is provided an automatic seat belt buckle tongue releasing mechanism for a seat belt associated with a vehicle seat that is removable from a vehicle comprising: a vehicle seat having a seat base and a seat back, the seat back being pivotable about an axis towards and away from the seat base, the seat base having a seat belt buckle attached thereto, the seat belt buckle having a release mechanism for releasing from the buckle a buckle tongue that is assembled with a seat belt webbing, the seat back having an actuator arm attached thereto that pivots with the seat back, the actuator arm causing the release mechanism of the seat belt buckle to operate in a buckle tongue releasing manner when the seat back is pivoted towards the seat base.

The actuator arm may be located above or below the seat belt mechanism and may exert a pushing or a pulling action on a component of the seat belt buckle to cause the tongue releasing mechanism to operate as the seat back is pivoted towards the seat base.

BRIEF DESCRIPTION OF THE DRAWINGS

FIGS. 4A and 4B show the vehicle seat of FIGS. 1A and 1B with the seat back returned to its normal operating condition during the reinstallation of the seat in the vehicle.

DETAILED DESCRIPTION OF THE INVENTION

Figure 1B:
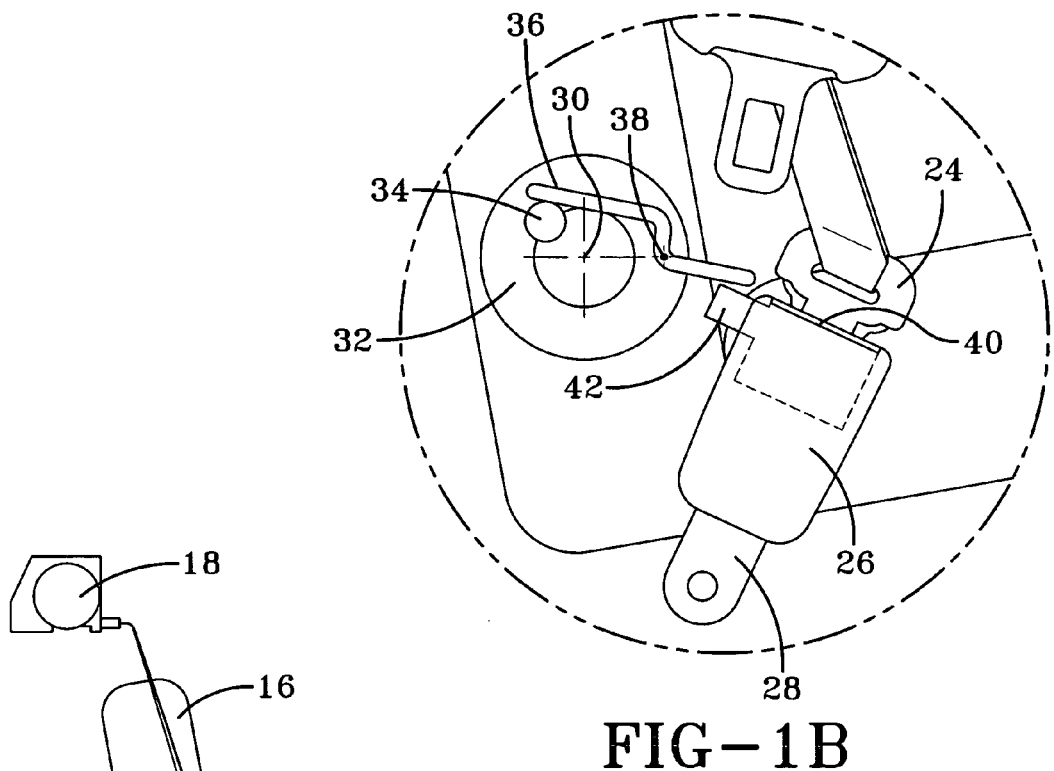
FIGS. 1A and 1B show a vehicle seat in its normal operating configuration with a first embodiment of an automatic seat belt buckle tongue releasing mechanism according to the invention in place.

Throughout this document the drawing figures including an "A" in the figure number are side elevation views of a vehicle seat and seat belt system, and the drawing figures including a "B" in the figure number are enlarged views of only the region where the seat base and seat cushion intersect.

With reference to FIGS. 1A through 4B a vehicle seat 10 has a seat base 12 and a seat back 14. The seat back may have a headrest 16 associated with it. A seat belt retractor 18, of any suitable configuration, is mounted to a suitable structural component of the vehicle above the seat. A suitable structural component of the vehicle would be, for example, the roof, a roof rail, side pillar, door frame and so forth.

Figure 1A:
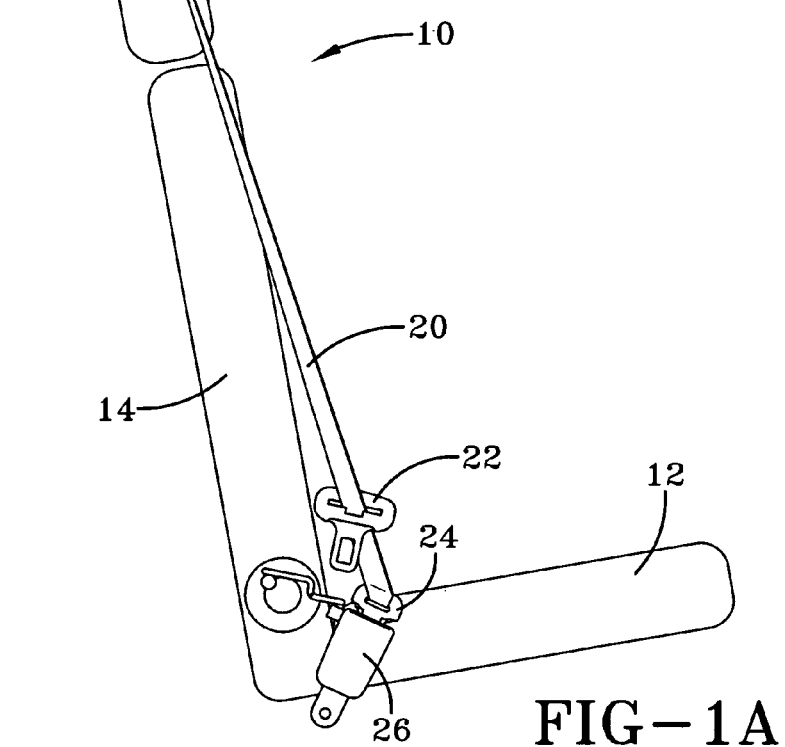

A length of seat belt webbing 20 is anchored to a spool in the seat belt retractor 18 in a customary manner and extends from the retractor. A first buckle tongue 22 is attached to the belt webbing in a manner such that the first buckle tongue can slide along the belt webbing. A second buckle tongue 24 is attached at an end of the belt webbing. The second buckle tongue 24 is shown in FIGS. 1 and 1A inserted into, and secured in, a seat belt buckle 26 that is mounted to a side of the seat base 12 by a steel strap 28 and a suitable fastening means such as, for example, threaded fasteners, rivets, welding and so forth. The seat belt buckle 26 is of a customary construction with the exception of certain features that will be described herein. The seat belt buckle 26 has a conventional release mechanism including a spring loaded button 40 for releasing the buckle tongue 24. In this embodiment of the invention an extension 42 of the spring loaded button 40 extends beyond the main body of the seat belt buckle 26. The seat belt buckle 26 mounted to the side of the seat base 12 and the seat belt retractor 18 mounted to a structural component of the vehicle serve as two of the anchors of the seat belt system. The third anchor is another seat belt buckle (not shown) located on the opposite side of the seat base from the one shown in the drawings and mounted to a structural member of the vehicle or the opposite side of the seat base. The first buckle tongue 22 is inserted into the other seat belt buckle when the seat belt webbing is pulled across the torso and lap of a person occupying the vehicle seat 10.

To facilitate the removal of the vehicle seat 10 from the vehicle, or even just the folding down of the seat back 14, to reconfigure the interior space of the vehicle the seat back 14 is pivotable about an axis 30 towards and away from the seat base 12. Owners of vehicles equipped with removable seats have tried to remove the seat with the buckle tongue 24 still engaged with the seat belt buckle 26 causing aggravation to the vehicle owner and unnecessary stresses on the seat belt structure. This problem can be avoided by the present invention that provides automatic seat belt buckle tongue releasing mechanism.

In the first embodiment shown in FIGS. 1A–4B a disk 32 is mounted to rotate around the same axis 30 that the seat back 14 pivots about. The disk 32 has a pin 34 projecting from it. The seat back 14 has an actuator arm 36 attached thereto. The actuator arm 36 is pivotable about an axis 38.

Figure 2B:
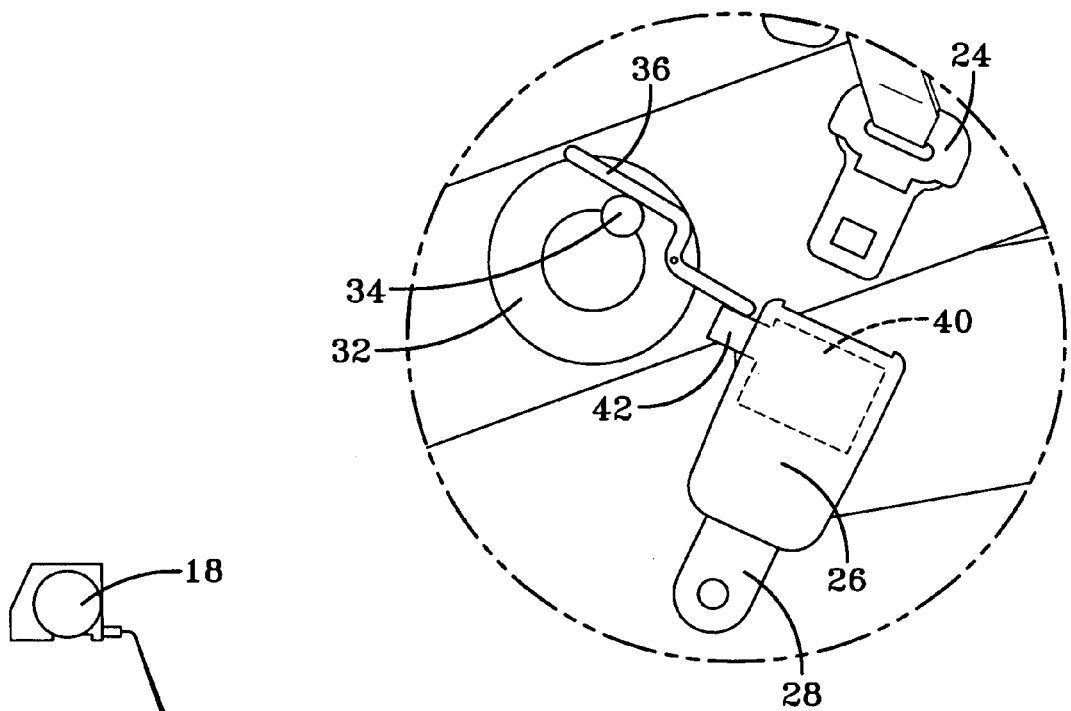
FIGS. 2A and 2B show the vehicle seat of FIGS. 1A and 1B during the pivoting of the seat forward, prior to removal of the seat from a vehicle.
Figure 2A:
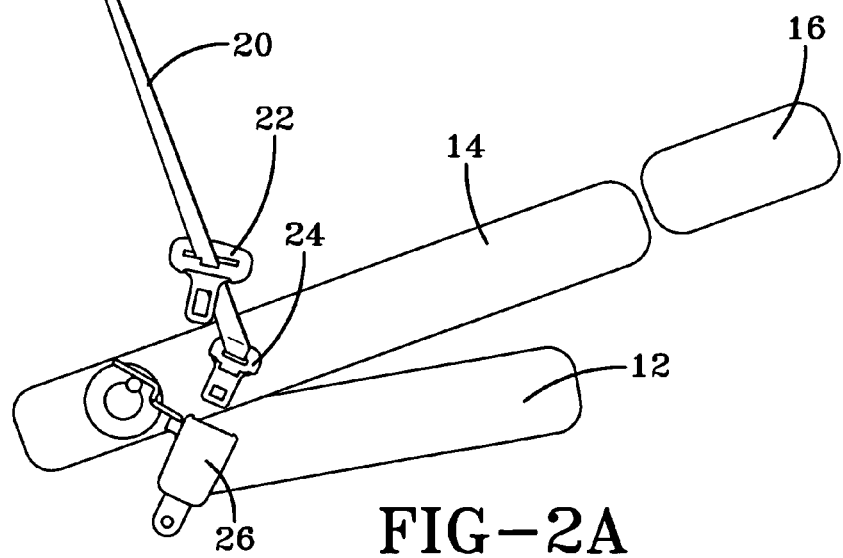

FIGS. 2 and 2A show the vehicle seat of the first embodiment during the process of pivoting the seat back 14 forward prior to removal of the seat from the vehicle. The disk 32 rotates with the seat back so that the pin 34 engages the actuator arm 36 and urges the actuator arm to pivot around the axis 38. The actuator arm engages and presses on the extension 42 of the spring loaded button 40 causing the release mechanism of the seat belt buckle to operate in a buckle tongue releasing manner when the seat back is pivoted towards the seat-base. It is believed that the disk should rotate at least about 10 degrees less than is needed for the total folding of the seat back seat before the buckle tongue is released to avoid the buckle tongue releasing in a crash.

In this first embodiment the actuator arm 36 is located above the seat belt buckle 26 and the actuator arm moves downward as the seat back 14 is pivoted towards the seat base 12 so that the actuator arm engages a component 40, 42 of the seat belt buckle that causes the tongue releasing mechanism of the seat belt buckle to operate. While a particular mechanism has been shown for moving the actuator arm downward it is understood that any suitable known or hereafter created mechanism, including cams, magnets, springs and so forth can be used in the practice of the claimed invention.

Figure 3B:
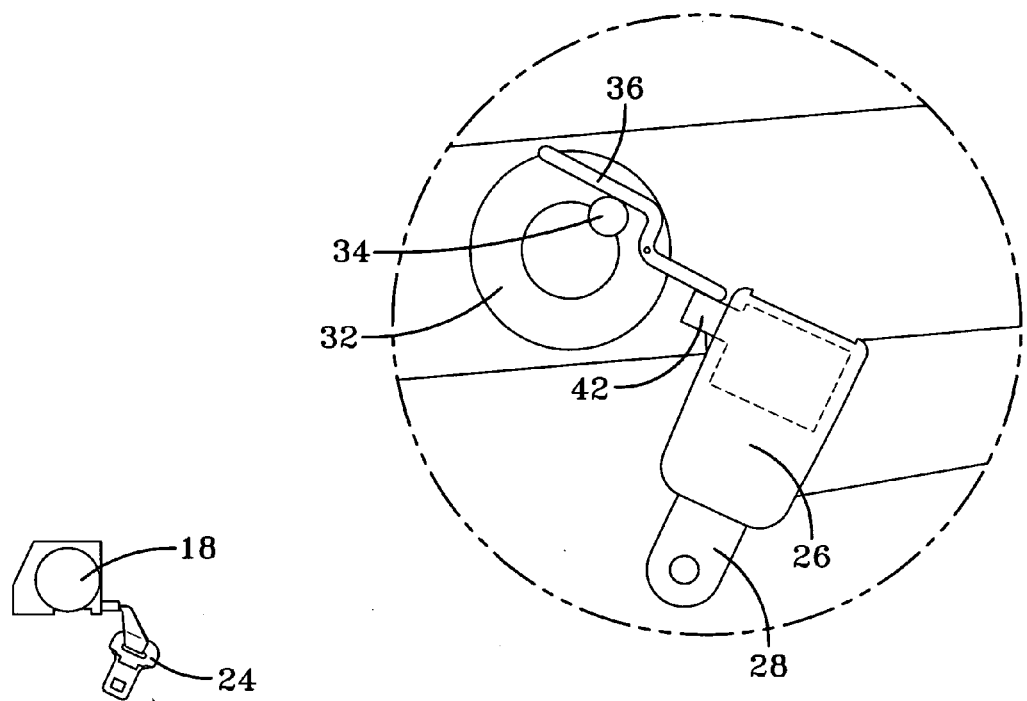
FIGS. 3A and 3B show the vehicle seat of FIGS. 1A and 1B with the seat back pivoted completely forward prior to removal of the seat from a vehicle.
Figure 3A:
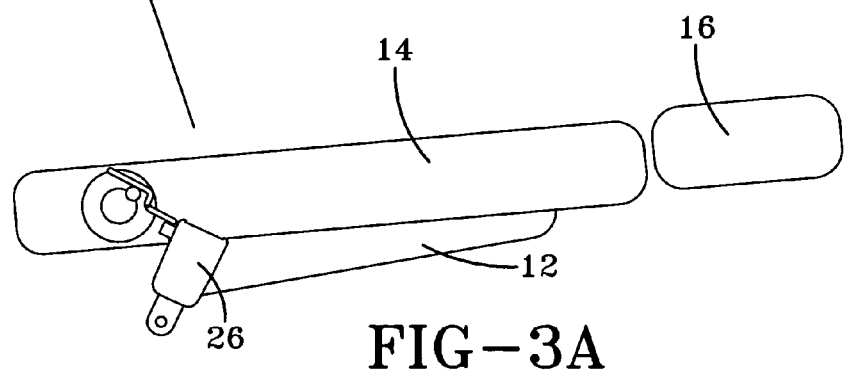
Figure 5B:
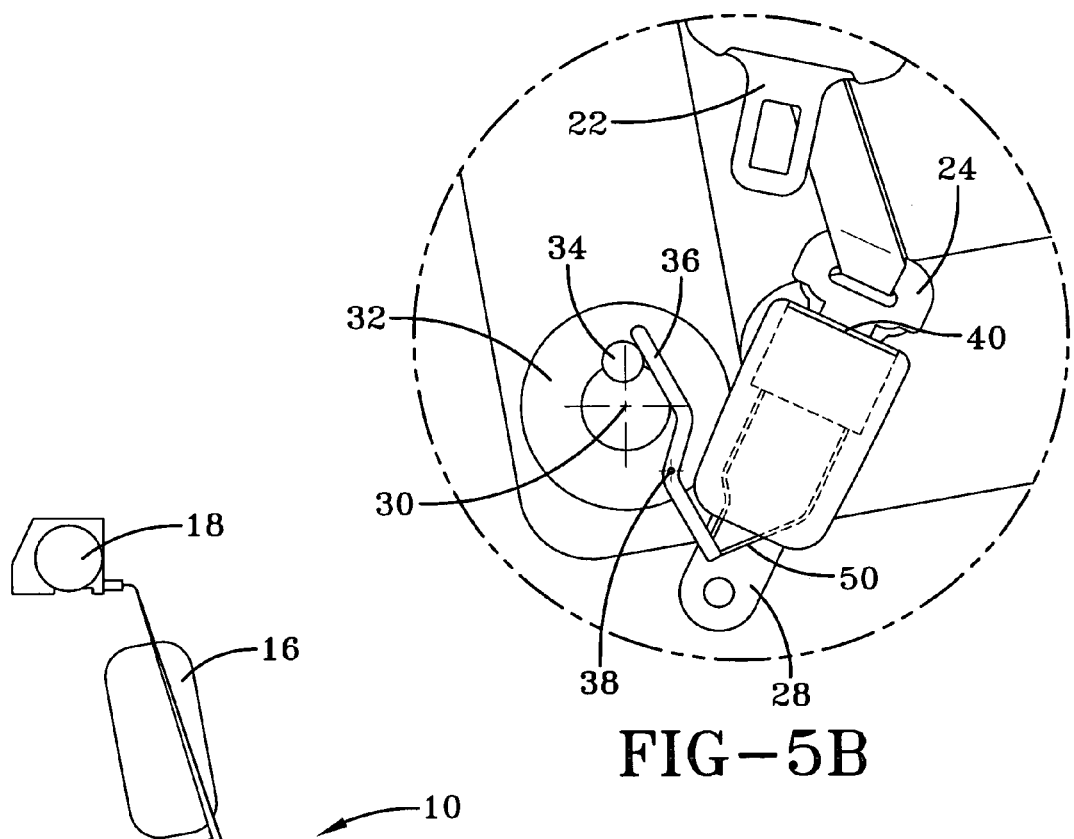
FIGS. 5A and 5B show a vehicle seat in its normal operating configuration with a second embodiment of an automatic seat belt buckle tongue releasing mechanism according to the invention.
Figure 5A:
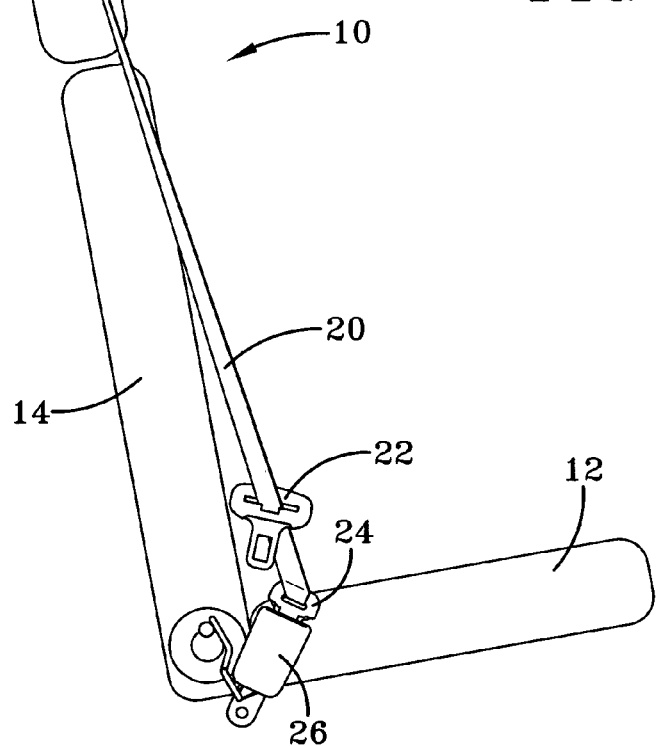
Figure 6B:
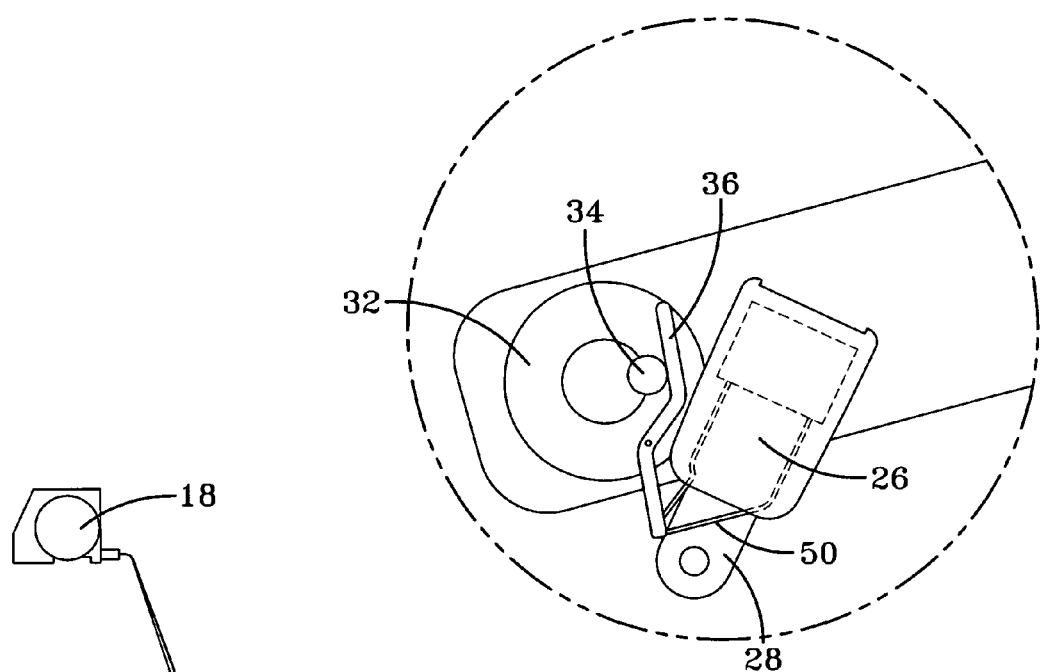
FIGS. 6A and 6B show the vehicle seat of FIGS. 5A and 5B during the pivoting of the seat back forward prior to removal of the seat from a vehicle.
Figure 6A:
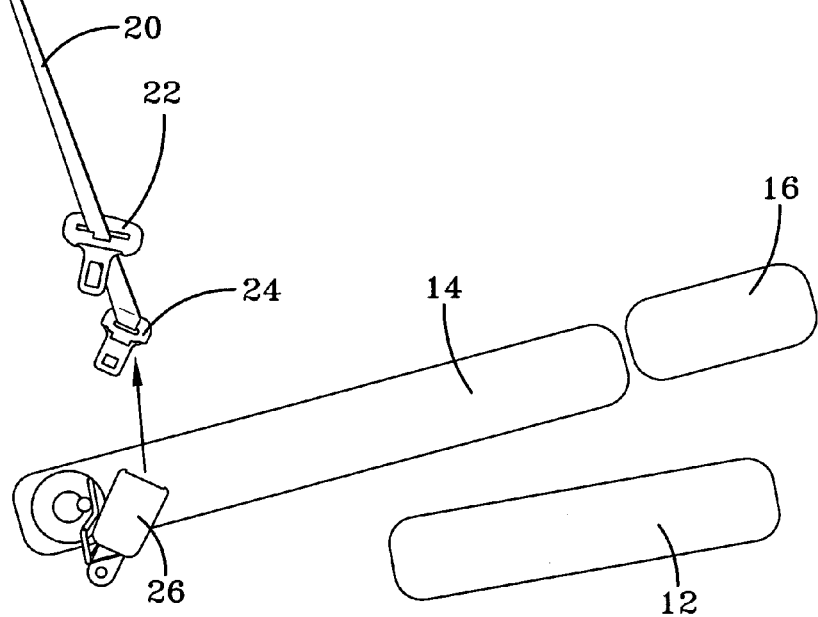

FIGS. 3A and 3B show the vehicle seat 10 with the seat back 14 completely pivoted completely forward prior to removal of the seat from the vehicle. Most of the seat belt webbing 20 has been pulled back into the seat belt retractor 18. After the buckle tongue 24 is released the pin 34 stops pushing the actuator arm 36 to avoid the increase of the load applied to the buckle tongue release mechanism. The button spring associated with the spring loaded button 40, 42 will push the actuator arm 36 on when returning to the normal position. The automatic seat belt buckle tongue releasing mechanism is ready to be used again.

FIGS. 4A and 4B show the vehicle seat of the first embodiment with the seat back returned to its normal operating condition during the process or reinstalling the seat in the vehicle. The second seat belt buckle tongue 24 can be placed back into the seat belt buckle 26 to return the seat to its normal operating configuration.

A second embodiment of the releasing mechanism of the invention is shown in FIGS. 5A–8B. The structures of the seat 10, seat belt retractor 18, seat belt webbing 20, and the buckle tongues 22, 24 are like that of the first embodiment described above. However, in this second embodiment the actuator arm 36 is located below the seat belt buckle 26 and the actuator arm moves downward as the seat back 14 is pivoted towards the seat base 12 so that the actuator arm exerts a pulling force upon a member 50 connecting the actuator arm to the tongue releasing mechanism of the seat belt buckle to cause the tongue releasing mechanism of the seat belt buckle to operate. In this example the member 50 connecting the actuator arm to the tongue releasing mechanism of the seat belt buckle is a metal cable, but it is understood that any suitable connecting member such as a rod, chain, and so forth could be employed in the practice of the claimed invention.

A comparison of the first embodiment to the second embodiment, as best done with reference to FIGS. 1A–2B and 5A–6B, shows that in the first embodiment the buckle tongue release mechanism is activated by the actuator arm exerting a pushing force on the mechanism and in the second embodiment the actuating arm exerts a pulling force on the mechanism.

Figure 7B:
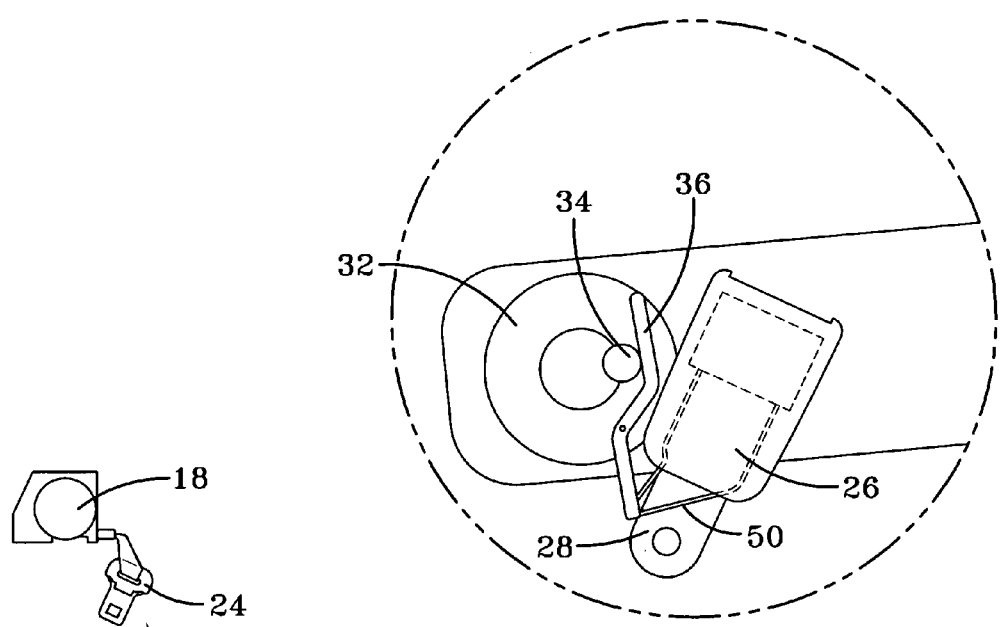
FIGS. 7A and 7B show the vehicle seat of FIGS. 5A and 5B with the seat back pivoted completely forward prior to removal of the seat from a vehicle.
Figure 7A:
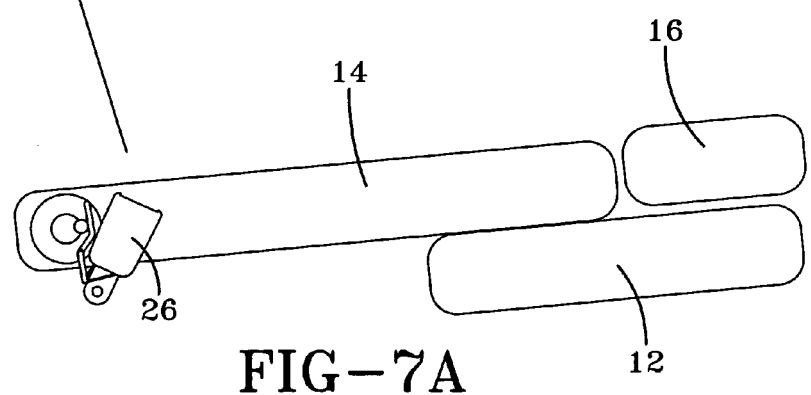

As with the first embodiment, as shown in FIGS. 7A and 7B the button spring associated with the spring loaded button 40 will pull the actuator arm 36 on when returning to its the normal position. The automatic seat belt buckle tongue releasing mechanism is ready to be used again.

Figures 8A, 8B:
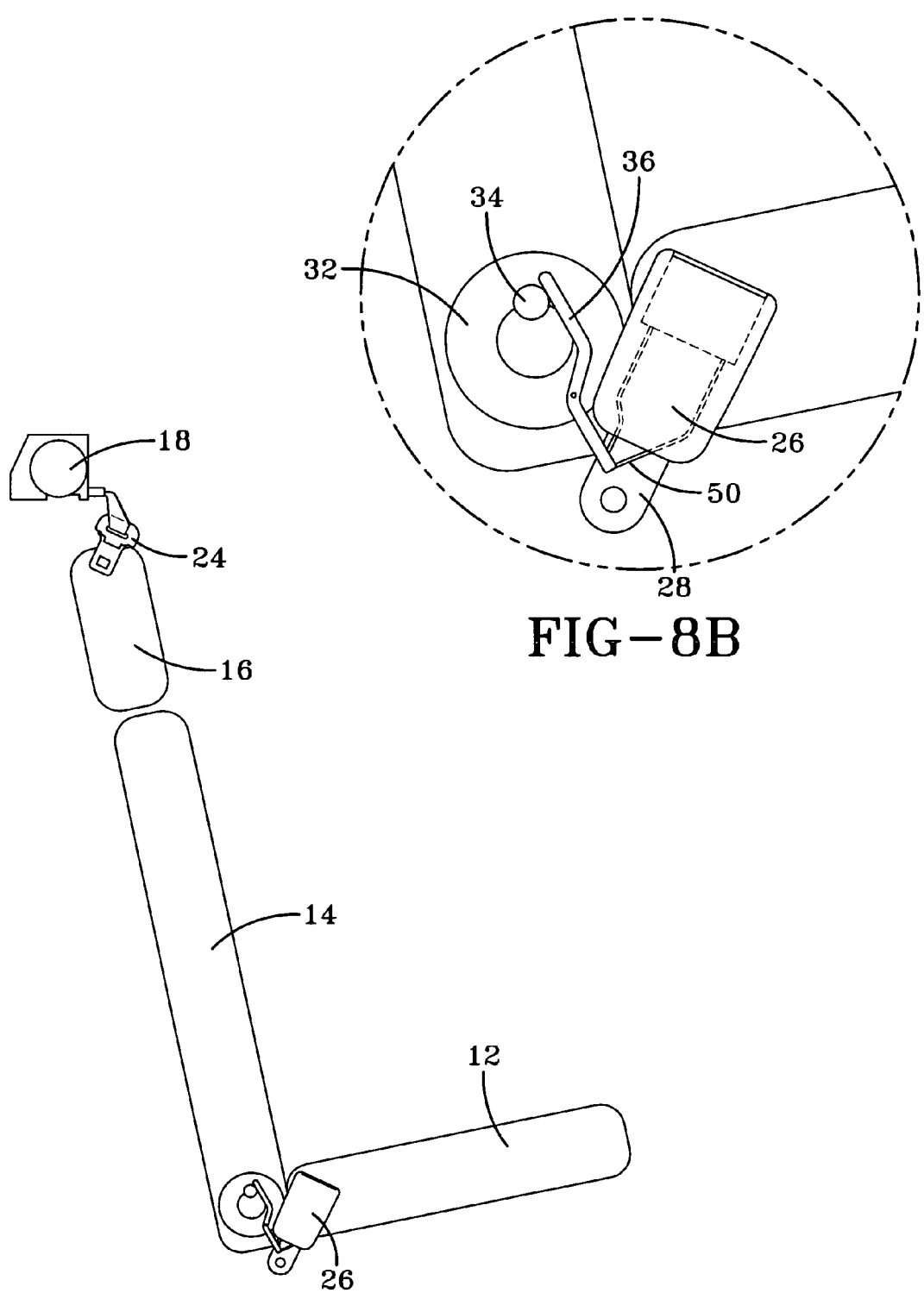
FIGS. 8A and 8B show the vehicle seat of FIGS. 5 and 5A with the seat back returned to its normal operating condition during the process of reinstalling the seat in the vehicle.

FIGS. 8A and 8B show the vehicle seat of the second embodiment with the seat back returned to its normal operating condition during the process or reinstalling the seat in the vehicle. The second seat belt buckle tongue 24 can be placed back into the seat belt buckle 26 to return the seat to its normal operating configuration.

The foregoing is illustrative of the present invention and is not to be construed as limiting thereof. The invention is defined by the following claims, with equivalents of the claims to be included therein.

What is claimed is:

1. An automatic seat belt buckle tongue releasing mechanism for a seat belt associated with a vehicle seat that is removable from a vehicle comprising: a vehicle seat having a seat base and a seat back, the seat back being pivotable about an axis towards and away from the seat base, the seat base having a seat belt buckle attached thereto, the seat belt buckle having a release mechanism for releasing from the seat belt buckle a buckle tongue that is assembled with a seat belt webbing, the seat back having an actuator arm attached thereto that pivots with the seat back, the actuator arm causing the release mechanism of the seat belt buckle to operate in a buckle tongue releasing manner when the seat back is pivoted towards the seat base.

2. The automatic seat belt buckle tongue releasing mechanism of claim 1 wherein the actuator arm is located above the seat belt buckle.

3. The automatic seat belt buckle tongue releasing mechanism of claim 2 further comprising a member arranged to rotate with the seat back and a pin projecting from the rotating member to engage and pivot the actuator arm to operate the release mechanism.

4. The automatic seat belt buckle tongue releasing mechanism of claim 3 wherein the actuator arm operates the release mechanism only when the seat back is substantially folded.

5. The automatic seat belt buckle tongue releasing mechanism of claim 4 wherein the actuator arm operates the release mechanism only within 10 degrees of when the seat back is totally folded.

6. The automatic seat belt buckle tongue releasing mechanism of claim 1 wherein the actuator arm is located below the seat belt buckle.

7. The automatic seat belt buckle tongue releasing mechanism of claim 6 further comprising a member arranged to rotate with the seat back and a pin projecting from the rotating member to engage and pivot the actuator arm to operate the release mechanism.

8. The automatic seat belt buckle tongue releasing mechanism of claim 7 wherein the actuator arm operates the release mechanism only when the seat back is substantially folded.

9. The automatic seat belt buckle tongue releasing mechanism of claim 8 wherein the actuator arm operates the release mechanism only within 10 degrees of when the seat back is totally folded.

10. The automatic seat belt buckle tongue releasing mechanism of claim 1 wherein the actuator arm is located above the seat belt buckle and the actuator arm moves downward as the seat back is pivoted towards the seat base so that the actuator arm engages a component of the seat belt buckle that causes the tongue releasing mechanism of the seat belt buckle to operate.

11. The automatic seat belt buckle tongue releasing mechanism of claim 10 further comprising a member arranged to rotate with the seat back and a pin projecting from the rotating member to engage and pivot the actuator arm to operate the release mechanism.

12. The automatic seat belt buckle tongue releasing mechanism of claim 11 wherein the actuator arm operates the release mechanism only when the seat back is substantially folded.

13. The automatic seat belt buckle tongue releasing mechanism of claim 12 wherein the actuator arm operates the release mechanism only within 10 degrees of when the seat back is totally folded.

14. The automatic seat belt buckle tongue releasing mechanism of claim 1 wherein the actuator arm is located below the seat belt buckle and the actuator arm moves downward as the seat back is pivoted towards the seat base so that the actuator arm exerts a pulling force upon a member connecting the actuator arm to the tongue releasing mechanism of the seat belt buckle to cause the tongue releasing mechanism of the seat belt buckle to operate.

15. The automatic seat belt buckle tongue releasing mechanism of claim 14 further comprising a member arranged to rotate with the seat back and a pin projecting from the rotating member to engage and pivot the actuator arm to operate the release mechanism.

16. The automatic seat belt buckle tongue releasing mechanism of claim 15 wherein the actuator arm operates the release mechanism only when the seat back is substantially folded.

17. The automatic seat belt buckle tongue releasing mechanism of claim 16 wherein the actuator arm operates the release mechanism only within 10 degrees of when the seat back is totally folded.

18. The automatic seat belt buckle tongue releasing mechanism of claim 1 further comprising a member arranged to rotate with the seat back and a pin projecting from the rotating member to engage and pivot the actuator arm to operate the release mechanism.

19. The automatic seat belt buckle tongue releasing mechanism of claim 18 wherein the actuator arm operates the release mechanism only when the seat back is substantially folded.

20. The automatic seat belt buckle tongue releasing mechanism of claim 19 wherein the actuator arm operates the release mechanism only within 10 degrees of when the seat back is totally folded.

* * * * *